United States Patent [19]
Tanioka

[11] Patent Number: 5,636,365
[45] Date of Patent: Jun. 3, 1997

[54] HIERARCHICAL BUFFER MEMORIES FOR SELECTIVELY CONTROLLING DATA COHERENCE INCLUDING COHERENCE CONTROL REQUEST MEANS

[75] Inventor: Takahiro Tanioka, Yamanashi, Japan

[73] Assignee: NEC Corporation, Tokyo, Japan

[21] Appl. No.: 318,439

[22] Filed: Oct. 5, 1994

[30]    Foreign Application Priority Data

Oct. 5, 1993  [JP]  Japan .................................. 5-248932

[51] Int. Cl.⁶ .................................................. G06F 12/08
[52] U.S. Cl. .......................... 395/490; 395/472; 395/449
[58] Field of Search .................................. 395/449, 427, 395/444, 447, 475, 468, 463, 471, 469, 472, 417, 490

[56]                References Cited

U.S. PATENT DOCUMENTS

| | | | |
|---|---|---|---|
| 4,445,174 | 4/1984 | Fletcher | 395/425 |
| 4,589,064 | 5/1986 | Chiba et al. | 395/491 |
| 4,755,930 | 7/1988 | Wilson, Jr. et al. | 395/425 |
| 4,775,955 | 10/1988 | Liu | 395/472 |
| 5,058,006 | 10/1991 | Durdan et al. | 395/325 |
| 5,193,163 | 3/1993 | Sanders et al. | 395/425 |
| 5,249,276 | 9/1993 | Honmura et al. | 395/417 |
| 5,253,353 | 10/1993 | Mogul | 395/425 |
| 5,265,232 | 11/1993 | Gannon et al. | 395/451 |
| 5,287,484 | 2/1994 | Nishii et al. | 395/425 |
| 5,317,720 | 5/1994 | Stamm et al. | 395/425 |
| 5,341,483 | 8/1994 | Frank et al. | 395/416 |
| 5,359,723 | 10/1994 | Mathews et al. | 395/425 |
| 5,369,753 | 11/1994 | Tipley | 395/425 |
| 5,394,555 | 2/1995 | Hunter et al. | 395/800 |
| 5,491,811 | 2/1996 | Arimilli et al. | 395/471 |

OTHER PUBLICATIONS

Patel et al., The i860: heart of a high-performance workstation, Computer Design, v28, n22, pS32(2). Nov. 13, 1989.

*Primary Examiner*—Matthew M. Kim
*Attorney, Agent, or Firm*—Whitham, Curtis, Whitham & McGinn

[57]            ABSTRACT

A buffer-memory coherence control mechanism for a data processing system includes a coherence control identification device. For each entry of a second buffer memory to which a plurality of first buffer memories is connected, a control bit for coherence control is stored in a control bit table. The control bit table is provided with 1 bit corresponding to each first buffer memory and indicates which first buffer memory shares a block corresponding to the second buffer memory. When coherence control between the first buffer memories is needed, a coherence control request is issued according to the content of the control bit table only to a specified first buffer memory. In addition, even if a block was cast out of the first buffer memory, the control bit table would not be updated.

23 Claims, 8 Drawing Sheets

HIERARCHICAL BUFFER MEMORIES FOR SELECTIVELY CONTROLLING DATA COHERENCE INCLUDING COHERENCE CONTROL REQUEST MEANS

BACKGROUND OF THE INVENTION

1. Field of the Invention

The present invention relates to an improvement in a mechanism which controls data coherence in a second buffer memory which is shared by a plurality of first buffer memories or cache memories.

2. Description of the Prior Art

In a second buffer memory shared by a plurality of first buffer memories of a store-through type, each time any one of the processors issues a store request, coherence control is performed with respect to the first buffer memories other than the first buffer memory connected to the processor which issued the store request. In coherence control, a block including an address of the store request is eliminated to prevent the inconsistency among the first buffer memories. The first buffer memories cannot receive the next request during coherence control. Therefore, during coherence control, it is necessary to prevent the processors themselves from having access to a buffer memory system.

In a conventional buffer memory system of the above type, the frequency of coherence control requests which are issued to the first buffer memories is increased, because the number of processors sharing a single main storage is increased. For this reason, on the one hand, the frequency of stopping the processors is increased, so there arises the problem that the overall performance of the system is reduced. Therefore, in order to enhance the overall performance of the system by increasing the number of processors, it is necessary to reduce the frequency of coherence control requests. On the other hand, in the conventional buffer memory system, coherence control is issued to all of the first buffer memories independently of whether each buffer memory includes a block with respect to which coherence control is performed.

A coherence control method for cache memories in a multiple processor system is disclosed in U.S. Pat. No. 5,265,232. In the method, a cross-invalid (XI) directory is provided on the side of a second cache memory, and each entry of the XI directory has a processor identifier (CPID) field for identifying an owner of that entry and an ownership field representative of the status of the ownership. In this prior art, the concept of "ownership" and the processor identifier field are combined so that invalidation can be realized by only changing the ownership identified by the processor identifier field.

However, in the above-described prior art, the ownership must be controlled by exclusive fetching, read-only fetching, conditionally-public fetching, and so on, so there is the drawback that ownership control becomes complicated.

BRIEF SUMMARY OF THE INVENTION

Object of the Invention

It is accordingly an object of the present invention to overcome the drawback of the prior art and to enhance the overall performance of a system by reducing the frequency of coherence control requests with respect to first buffer memories which do not have a block requiring coherence control.

Another object of the present invention is to alleviate the load of the first buffer memory by reducing the frequency of control information to be sent from the first buffer memory to the second buffer memory.

Summary of the Invention

The foregoing objects are accomplished in accordance with the present invention by providing a buffer-memory coherence control mechanism for a data processing system. The coherence control mechanism comprises a coherence control identification means for identifying a data region having the possibility of being included in buffer memories. The coherence control mechanism further comprises a coherence control request means for, when issuing a coherence control request of a certain data region to the buffer memories, issuing the coherence control request to only the buffer memory identified as having the possibility of including the data region by the coherence control identification means.

BRIEF DESCRIPTION OF THE DRAWINGS

The above and other objects and advantages will become apparent from the following detailed description when read in conjunction with the accompanying drawings wherein.

DETAILED DESCRIPTION OF THE PREFERRED EMBODIMENTS

Figure 1:
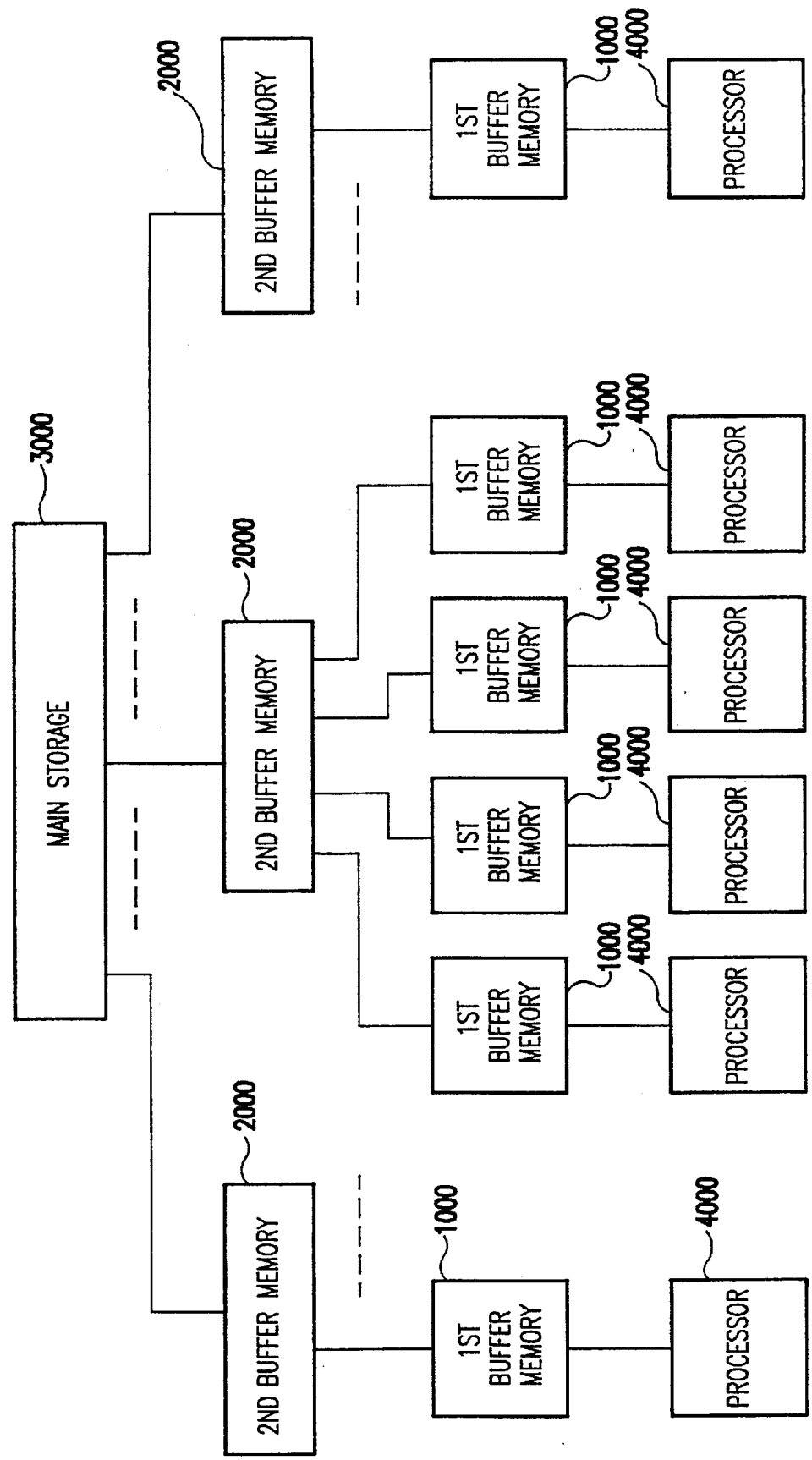
FIG. 1 is a block diagram showing a data processing system comprising hierarchical buffer memories of the present invention.

Referring now in greater detail to the drawings and initially to FIG. 1, a data processing system to which the present invention may be applied comprises main memory 3000 and a plurality of processors 4000 each of which is connected to a first buffer memory 1000. The plurality of first buffer memories 1000 is connected to the plurality of second buffer memories 2000. One first buffer memory 1000 is not connected to the plurality of second buffer memories 2000 at the same time, but one second buffer memory 2000 is connected with one or more first buffer memories 1000.

Figure 2:
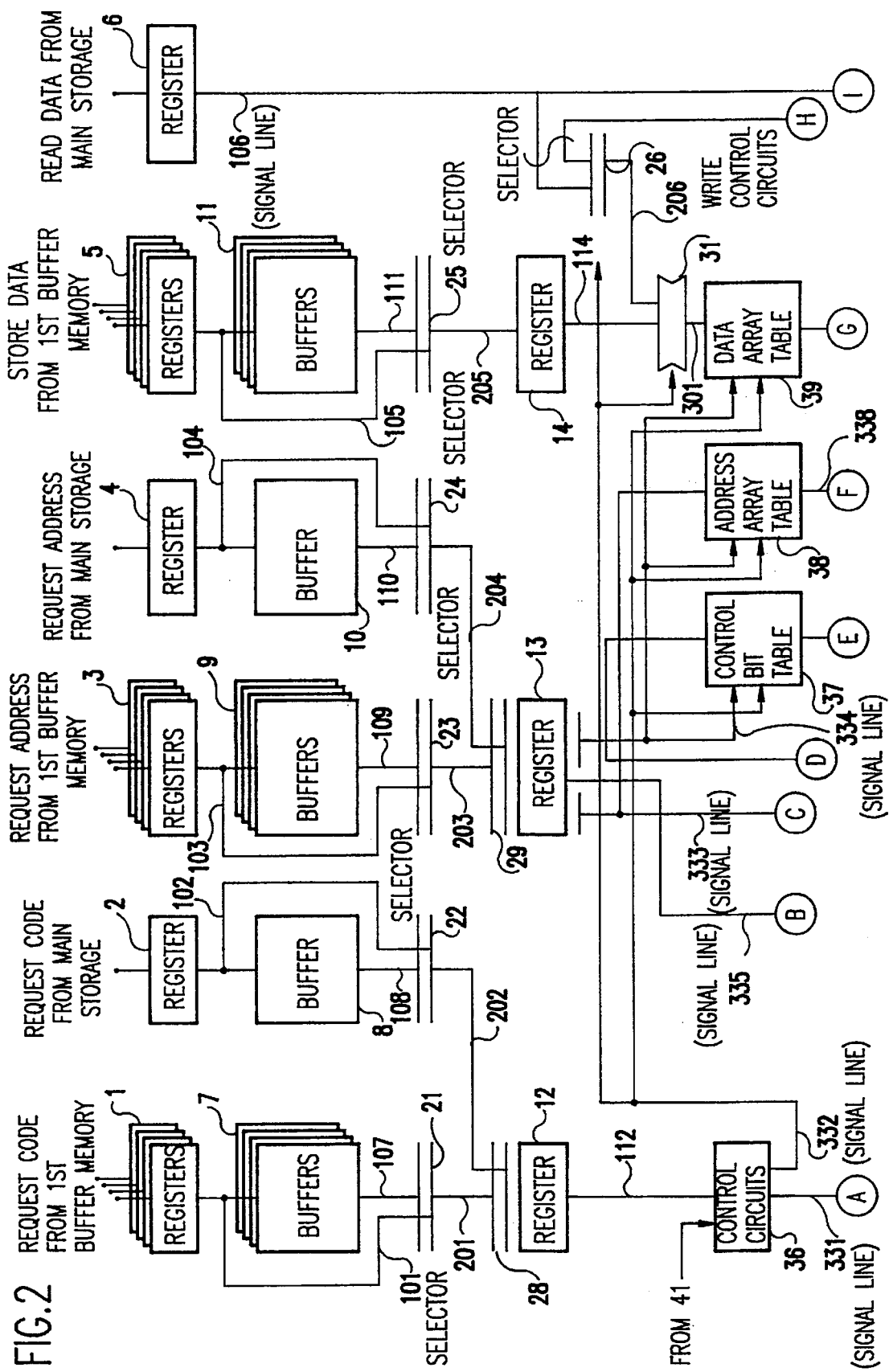
FIG. 2 is a block diagram showing the second buffer memory of the present invention.
Figure 2A:
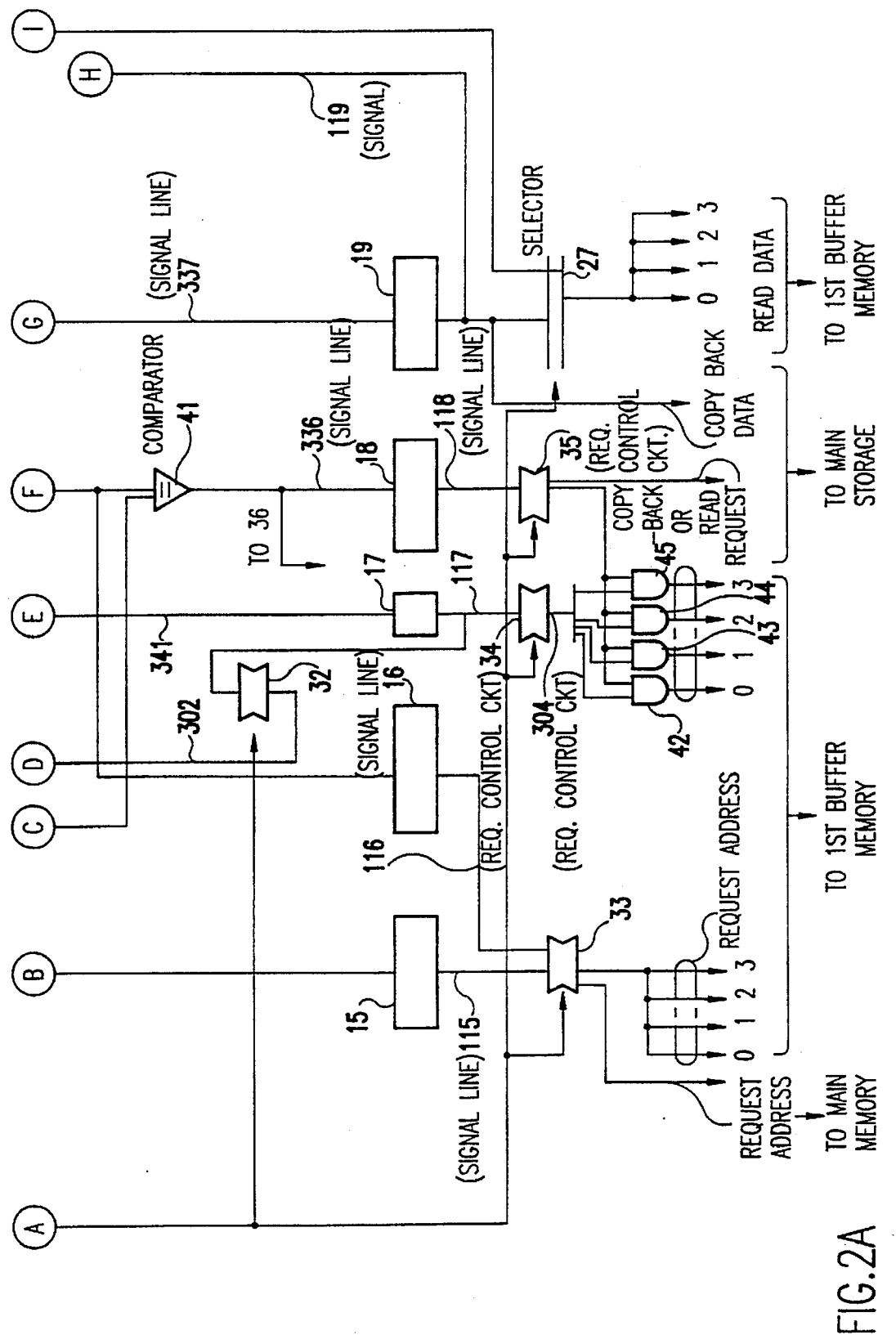

Referring to FIG. 2, the second buffer memory in this embodiment is connected to four store-through first buffer memories which are connected to the processors. This second buffer memory is controlled by a store-in method.

Referring to FIG. 2, a set of registers 1 comprises four registers respectively connected to the four first buffer memories. After receiving a request code output from the first buffer memories, i.e., a request code for reading a block or writing data, the registers 1 output it to a signal line 101.

A set of buffers 7 comprises buffers respectively corresponding to the registers 1. After buffering the request code from the first buffer memories received by the registers 1, the buffers 7 output it to a signal line 107.

A selector 21 selects a request code to be next executed from the request codes held by the registers 1 and the buffers 7 and then outputs it to a signal line 201. A register 2 receives a request code output from main storage, i.e., a request code such as a copy-back of a block or coherence control of the second buffer memory and the first buffer memory and then outputs it to a signal line 102.

A buffer 8 buffers the request code from main storage received by the register 2 and then outputs it to a signal line 108.

A selector 22 selects the request code to be next executed from the request codes held by the register 2 and the buffer 8 and then outputs it to a signal line 202.

A selector 28 selects the request code to be next executed from the request code from the first buffer memory input through the signal line 201 and the request code from main storage input through the signal line 202. The selected request code is stored in a register 12.

A set of registers 3, as with the set of registers 1, comprises four registers respectively connected to the four first buffer memories. After receiving a request address which is sent from the first buffer memories together with a request code, the registers 3 output it to a signal line 103.

A set of buffers 9, as with the set of buffers 7, comprises buffers respectively corresponding to the registers 3. After buffering the request address from the first buffer memories received by the registers 3, the buffers 7 output it to a signal line 109.

A selector 23, as with the selector 21, selects the request address to be next executed from the request addresses held by the registers 3 and the buffers 9 and then outputs it to a signal line 203.

A register 4 receives a request address which is sent from main storage together with a request code, and then outputs it to a signal line 104.

A buffer 10, as with the buffer 8, buffers the request address from main storage received by the register 4 and then outputs it to a signal line 110.

A selector 24, as with the selector 22, selects the request address to be executed next from among the request codes held by the buffer 10 and then outputs it to a signal line 204.

A selector 29 selects the request address to be next executed from the request address from the first buffer memory input through the signal line 203 and the request address from main storage input through the signal line 204. This selected request address is stored in a register 13. The request address stored in the register 13 is output through a signal line 335. Also, one part of that request address is output through a signal line 333 and the other part is output through a signal line 334.

A set of registers 5, as with the set of registers 1, comprises four registers respectively connected to the four first buffer memories. When the request from the first buffer memories is a data store request, the registers 5 receive the store data and then output it to a signal line 105.

A set of buffers 11, as with the set of buffers 7, comprises buffers respectively corresponding to the registers 5. After buffering the store data received by the registers 5, the buffers 11 output it to a signal line 111.

A selector 25, as with the selector 21, selects the store data to be next executed from the store data held by the registers 5 and the store data held by the buffers 11 and then outputs it to a signal line 205. The store data output to the signal line 205 is stored in a register 14.

A control circuit 36 receives the request code from the register 12 and also a result of comparison from a comparator 41 and, based on the request code and the comparison result, controls selectors 26 and 27, a write control circuit 31, a control bit set circuit 32, request control circuits 33 to 35, an address array table 38, a data array table 39, and a control bit table 37 through control signal lines 331 and 332.

A part of the request address output through a signal line 334 from the register 13 is used as an index address for buffer memories to index the address array table 38, the data array table 39, and the control bit table 37.

The control bit table 37 holds control bit information corresponding to each of the four first buffer memories, for each block of the second buffer memory. The reading out of the control bit table 37 and the writing to the control bit table 37 are controlled through the control signal line 332 by means of the control circuit 36.

The key output from the address array table 38 and a part of the request address output from the register 13 are compared by means of the comparator 41. When the two match, it is judged that the buffer has made a hit. When the two do not match, it is judged that the buffer has made a miss-hit. The result of these judgments is output through a signal line 336.

A register 15 stores the request address output through a signal line 335 from the register 13, and the request address stored in the register 15 is output from a signal line 115.

A register 16 is one which stores the key output through a signal line 338 from the address array table and the key stored in the register 16 is output from a signal line 116.

The request control circuit 33, under the control of the control circuit 36, generates request addresses for main storage and the first buffer memories, based on the request address stored in the register 15 and the key stored in the register 16. The request addresses generated in the request control circuit 33 are output to main storage and the first buffer memories.

A register 17 stores the control bit output through a signal line 341 from the control bit table 37, and the control bit stored in this register 17 is output from a signal line 117.

The request control circuit 34, under the control of the control circuit 36, determines whether to send a coherence control request to any one of the four first buffer memories, based on the control bit stored in the register 17. This determination result is output through a signal line 304 to AND circuits 42 through 45.

A register 18 stores the judgment result of the hit or miss-hit of the buffer memory that is output from the comparator 41 through the signal 336. The judgment result stored in the register 18 is output from a signal line 118.

The request control circuit 35, under the control of the control circuit 36, generates request addresses for main storage and the first buffer memories, based on the judgment result of the hit or miss-hit of the buffer memory stored in the register 18.

The AND circuits 42 to 45 are connected to four first buffer memories, respectively, and output the request code generated in the request control circuit 35 to only the first buffer memory determined in the request control circuit 34.

A register 19 stores the block data of the buffer memory output from the data array table 39 through a signal line 337, and the block data stored in the register 19 is output from a signal line 119.

A register 6 receives and stores the block data sent from main storage. The block data stored in the register 6 is output from a signal line 106.

A selector 26 selects either one of the block data from main storage input through the signal line 106 and the block data from the data array table 39 input through the signal line 119, and outputs it through a signal line 206 to the write control circuit 31.

The write control circuit 31, under the control of the control circuit 36, combines the store data from the first buffer memory stored in the register 14 and the block data output through the signal line 114 from the selector 26 together, when necessary. This result is output through a signal line 301 to the data array table 39.

A selector 27, under the control of the control circuit 36, selects either one of the block data stored in the register 19 and the block data stored in the register 6, and sends it to the first buffer memories.

The control bit set circuit 32, under the control of the control circuit 36, generates bit information for updating the control bit of the control bit table 37, based on the control bit stored in the register 17.

The operation of the buffer memory system of the above-described embodiment of the present invention will hereinafter be described with reference to the drawings.

Figure 4:
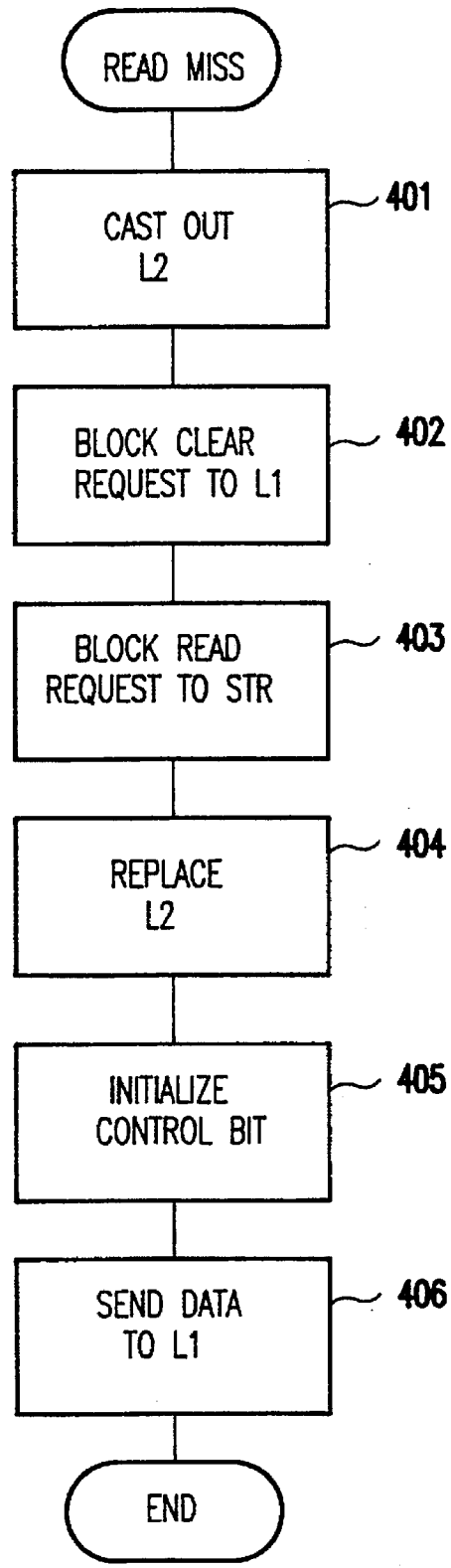
FIG. 4 is a flowchart showing the processing procedure executed when a miss-hit has occurred with respect to a read request.

(1) When a miss-hit is detected in a second buffer memory with respect to a read request from a first buffer memory, the registration of a block from main storage in the second buffer memory and the initialization of the control bit table 37 are performed and then data is sent to the first buffer memory, as will be described below. A description will be made with reference to FIGS. 2 and 4.

The read request code and read request address from the first buffer memory are first received in the registers 1 and the registers 3, respectively. The read request code is buffered in the buffers 7 as the occasion demands and then stored in the register 12. The read request address is buffered in the buffers 9 as the occasion demands and then stored in the register 13.

In the next cycle, the control circuit 36 judges that the read request code is a read request code sent from the first buffer memory and also uses a part of the read request address to index the control bit table 37, the address array table 38, and the data array table 39. The key extracted from the address array table 38 is compared in the comparator 41 with a part of the read request address. As a result, it is detected that a miss-hit has occurred in the second buffer memory. The read request address, the key, the control bit, the miss-hit information, and the block data are stored in the registers 15, 16, 17, 18, and 19, respectively.

When the miss-hit with respect to the read request is detected as described above, the block will be cast out (step 401) so that the block of the second buffer memory (L2 in the FIG.4) is replaced with a new block. Since this embodiment is based on a direct mapping method, the block to be cast out is determined without further consideration. Even if this embodiment were based on a set-associative method, it could be determined, for example, based on a least recently used (LRU) method, which block is cast out.

Upon this block cast-out, a block clear request (step 402) is sent to the first buffer memory (L1 in the FIG.4) and a block read request (step 403) is sent to main storage. At this time, the request control circuit 33 transmits the request address stored in the register 15 to main storage. The request control circuit 55 also generates a block clear request address with respect to the first buffer memory, based on the request address stored in the register 15 and the key stored in the register 16, and transmits this generated address to all of the first buffer memories.

This address generation is performed by replacing the key of the block with the key of the request address. Also, the request control circuit 34 decides a first buffer memory having an access history with respect to the block which issues the block clear request, based on the control bit stored in the register 17. Then, the AND circuits 42 to 45 perform the logic operation between the output of the request control circuit 34 and the block clear request with respect to the first buffer memory generated in the request control circuit 35, and transmit the block clear request to an arbitrary first buffer memory. The request control circuit 35 generates a block read request and transmits it to main storage. The block data stored in the register 19 are transmitted as copy-back data to main storage. At this time, the output of the selector 27 is not transmitted to a first buffer memory.

If the read data from main storage is received in the register 6, the read data will be written through the selector 26 and the write control circuit 31 to the data array table B9. A key is then extracted from a part of the request address stored in the register 13 and stored in the address array table 38. In this manner, the block of the second buffer memory is replaced (step 404).

The control bit set circuit 32 generates a control bit in which only the part corresponding to the first buffer memory from which the read request was output is "1" and the remaining part is "0", and writes this control bit on the control bit table 37 (step 405). The selector 27 selects the block data from the register 6 and transmits it to the first buffer memory (step 406).

Figure 5:
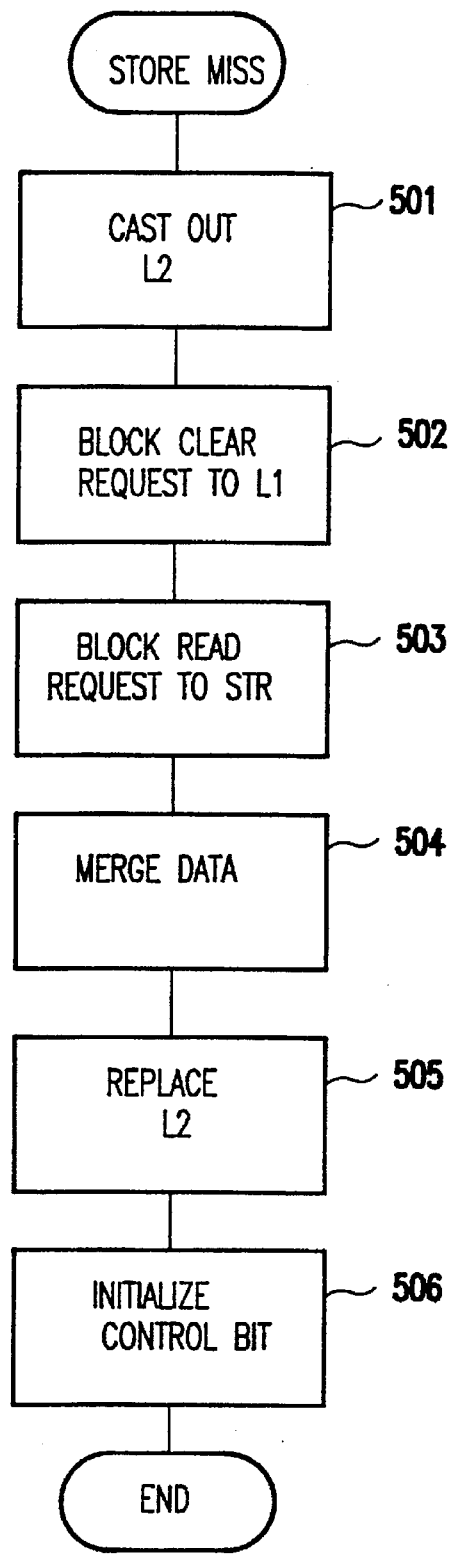
FIG. 5 is a flowchart showing the processing procedure executed when a miss-hit has occurred with respect to a store request.

(2) When a miss-hit is detected in a second buffer memory with respect to a store request from a first buffer memory, the registration of a block from main storage in the second buffer memory and the initialization of the control bit table 37 are performed and then data is sent to the second buffer memory, as will be described below. A description will be made with reference to FIGS. 2 and 5.

The request code, read request address, and store data from the first buffer memory are first received in the registers 1, the registers 3, and the registers 5. The request code is buffered in the buffers 7 as the occasion demands and then stored in the register 12. The request address is buffered in the buffers 9 as the occasion demands and then stored in the register 13. The store data is buffered in the buffers 11 as the occasion demands and then stored in the register 14.

In the next cycle, the control circuit 36 judges that the request code is a store request code sent from the first buffer memory and also uses a part of the store request address to index the control bit table 37, the address array table 38 and the data array table 39. The key extracted from the address array table 38 is compared in the comparator 41 with a part of the request address. As a result, it is detected that a miss-hit has occurred in the second buffer memory. The request address, the key, the control bit, the miss-hit information, and the block data are stored in the registers 15, 16, 17, 18, and 19, respectively.

When the miss-hit with respect to the store request is detected as described above, the block will be cast out (step 501) so that the block of the second buffer memory is replaced with a new block. In addition, upon this block cast-out, a block clear request is sent to the first buffer memory (step 502) and a block read request is sent to main storage (step 503).

If the read data from main storage is received in the register 6, this read data will be input to the selector 26 and the write control circuit 31. The read data is combined with the store data stored in the register 14 (step 504) and written to the data array table 39 (step 505). In addition, the control bit set circuit 32 generates a control bit whose bits are all "0" and writes it to the control bit table 37 (step 506). At this time, the output of the selector 27 is not sent to the first buffer memory.

Figure 6:
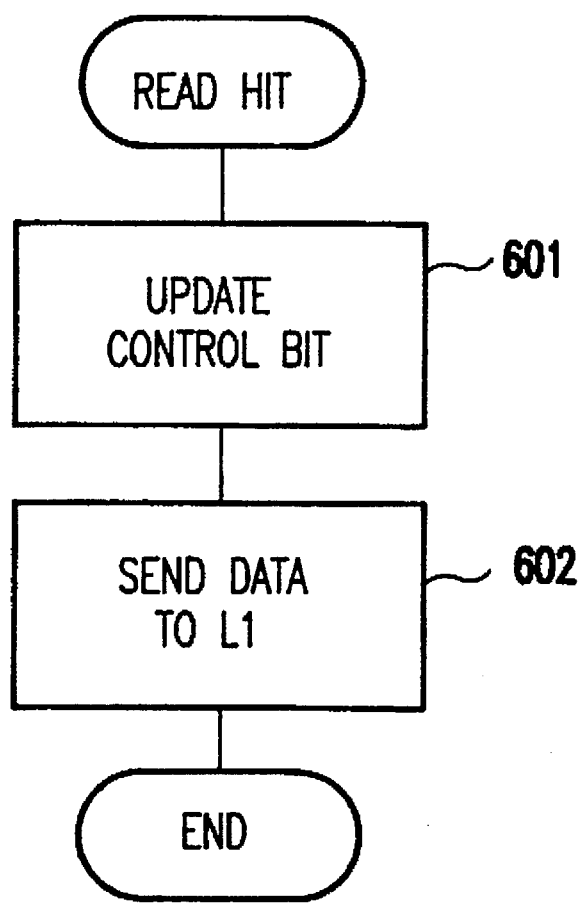
FIG. 6 is a flowchart showing the processing procedure executed when a hit has occurred with respect to the read request.

(3) When a hit in a second buffer memory is detected with respect to a read request from a first buffer memory, the control bit table 37 is updated and then data is sent to the first buffer memory, as will be described below. A description will be made with reference to FIGS. 2 and 6.

The read request code and read request address from the first buffer memory, as in the case of the miss-hit of the read request, are buffered, and the control bit table 37, the address array table 38, and the data array table 39 are indexed. The key extracted from the address array table 38 is compared in the comparator 41 with a part of the request address. As a result, it is detected that a hit has occurred in the second memory. The request address, the key, the control bit, the hit information, and the block data are stored in the registers 15, 16, 17, 18, and 19, respectively.

In the next cycle, the control bit set circuit 32 generates a new control bit in which, among the control bit stored in the register 17, only the part corresponding to the first buffer memory from which the read request was output is made "1", and writes this new control bit to the control bit table 37 (step 601). The selector 27 selects the block data stored in the register 19 and transmits it to the first buffer memory (step 602).

Figure 7:
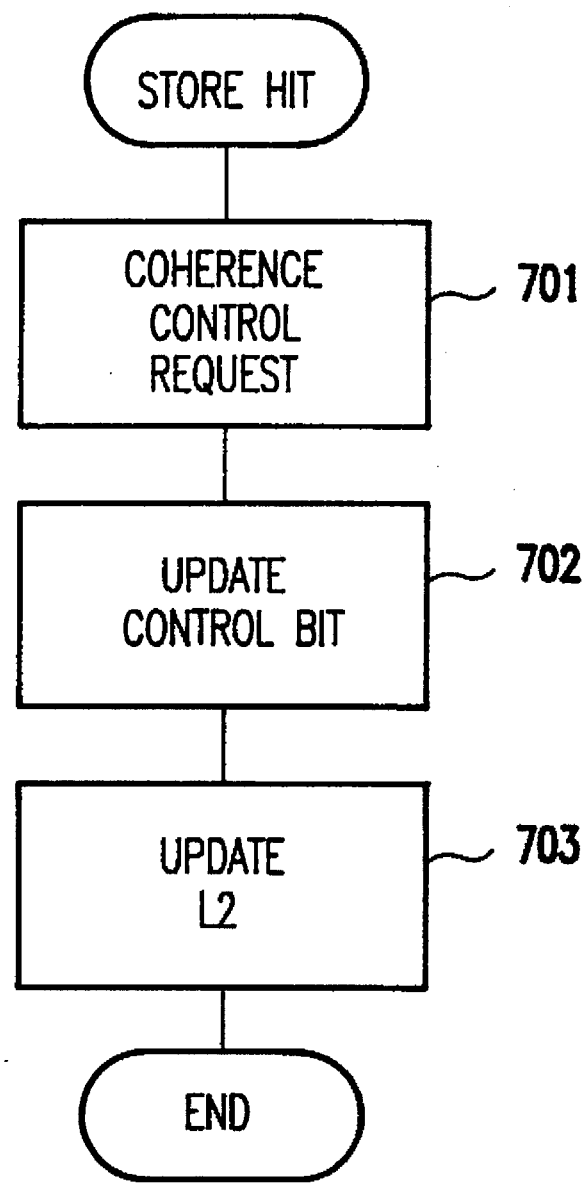
FIG. 7 is a flowchart showing the processing procedure executed when a hit has occurred with respect to the store request.

(4) When a hit in a second buffer memory is detected with respect to a store request from a first buffer memory, a coherence control request is sent to first buffer memories other than the first buffer memory from which the store request was output, the control bit table 37 is updated, and the second buffer memory is written to, as will be described below. A description will be made with reference to FIGS. 2 and 7.

First, the request code, request address, and store data from the first buffer memory, as in the case of the miss-hit of the store request, are buffered, and the control bit table 37, the address array table 38, and the data array table 39 are indexed. The key extracted from the address array table 38 is compared in the comparator 41 with a part of the request address. As a result, it is detected that a hit has occurred in the second memory. The request address, the key, the control bit, the hit information, and the block data are stored in the registers 15, 16, 17, 18, and 19, respectively.

In the next cycle, the request control circuit 34 decides based on a first buffer memory that a coherence control request is issued, based on the control bit stored in the register 17. More particularly, the request control circuit 34 selects buffer memories which have an access history with respect to a block being just about to be stored and which excludes the first buffer memory from which the store request was output. Then, in the AND circuits 42 to 45, a logical AND operation is performed between the result of the request control circuit 34 and the coherence control request with respect to a first buffer memory generated in the request control circuit 35. As a consequence, the coherence control request with respect to a first buffer memory is issued to an arbitrary first buffer memory (step 701). With respect to a first buffer memory not having an access history in the past with respect to a block being just about to be stored and the first buffer memory from which the store request was output no coherence control request is issued.

The control bit set circuit 32 generates a new control bit in which, among the control bit stored in the register 17, only the part corresponding to the first buffer memory from which the store request was output is made "1" and the remaining part is made "0". This new control bit is written to the control bit table 37 (step 702).

The block data stored in the register 19 is selected by the selector 26. The data selected by the selector 26 is combined in the write control circuit 31 with the store data from the register 14, and the combined data is written to the data array table 39 (step 703).

(5) When, as shown in FIG. 1, a plurality of second buffer memories is connected to a single main storage, it is necessary to take into consideration the copy-back request and the block clear request of block data from main storage, because coherence control of the second buffer memories is performed. More particularly, the second buffer memories need to be configured so that the copy-back request for copying the block of the second buffer memory back to main storage and the block clear request for clearing the block of the second buffer memory can be received from main storage. Therefore, in the second buffer memory in FIG. 2, the registers 2 and 4 and the buffers 8 and 10 are provided so that requests from main storage can also be received by the selectors 28 and 29.

When a hit in the second buffer memory is detected with respect to the copy-back request and the block clear request of the block data from main storage, the operation will be as follows: Note that, when the block data of the second buffer memory is copied back to main storage or cleared, a corresponding block in the first buffer memory is also cleared at the same time.

The request code and request address of the copy back request sent from main storage are received in the registers 2 and 4 and buffered in the buffers 8 and 10, as in the case of receiving the request the first buffer memory. If the request from main storage is selected by the selectors 8 and 9, the request code and the request address of the copy-back request will be stored in the registers 12 and 13. As with the processing of the request from the first buffer memory, the control bit table 37, the address array table 38, and the data array table 39 are indexed, and the hit of the second buffer memory is judged in the comparator 41. The request address, the key, the control bit, the hit information, and the block data are stored in the registers 15, 16, 17, 18, and 19, respectively.

In the next cycle, the request control circuit 33 sends to each first buffer memory the request address from the register 15. The request control circuit 34 decides the first buffer memory that a block clear request is to be issued, based on the control bit stored in the register 17. More particularly, a first buffer memory is selected having an access history in the past with respect to block data in the second buffer memory which is just about to be copied back to main storage. Then, in the AND circuits 42 to 45, a logical AND operation is performed between the result of the request control circuit 34 and the block clear request with respect to a first buffer memory generated in the request control circuit 35. As a consequence, the copy-back request with respect to a first buffer memory is issued to an arbitrary first buffer memory. The block data stored in the register 19 is sent as copy-back data back to main storage, when necessary. The determination of whether the block of the second buffer memory is cleared or copied back is performed by a general store-in coherence control algorithm of buffer memories.

(6) When a miss-hit in the second buffer memory is detected with respect to the copy-back request and the block clear request of the block data from main storage, the processing in the second buffer memory is ended at that time, as will be described below.

As with the case of the hit, the request code and the request address of the copy-back request sent from the main storage are buffered, the control bit table 37, the address array table 38, and the data array table 39 are indexed, and the hit and the miss-hit of the second buffer memory are judged. The miss-hit information detected in the comparator 41 is sent to the control circuit 36, and a process for a request being currently executed is interrupted.

The operation of the above-described embodiment of the present invention will hereinafter be described in detail.

Figure 3:
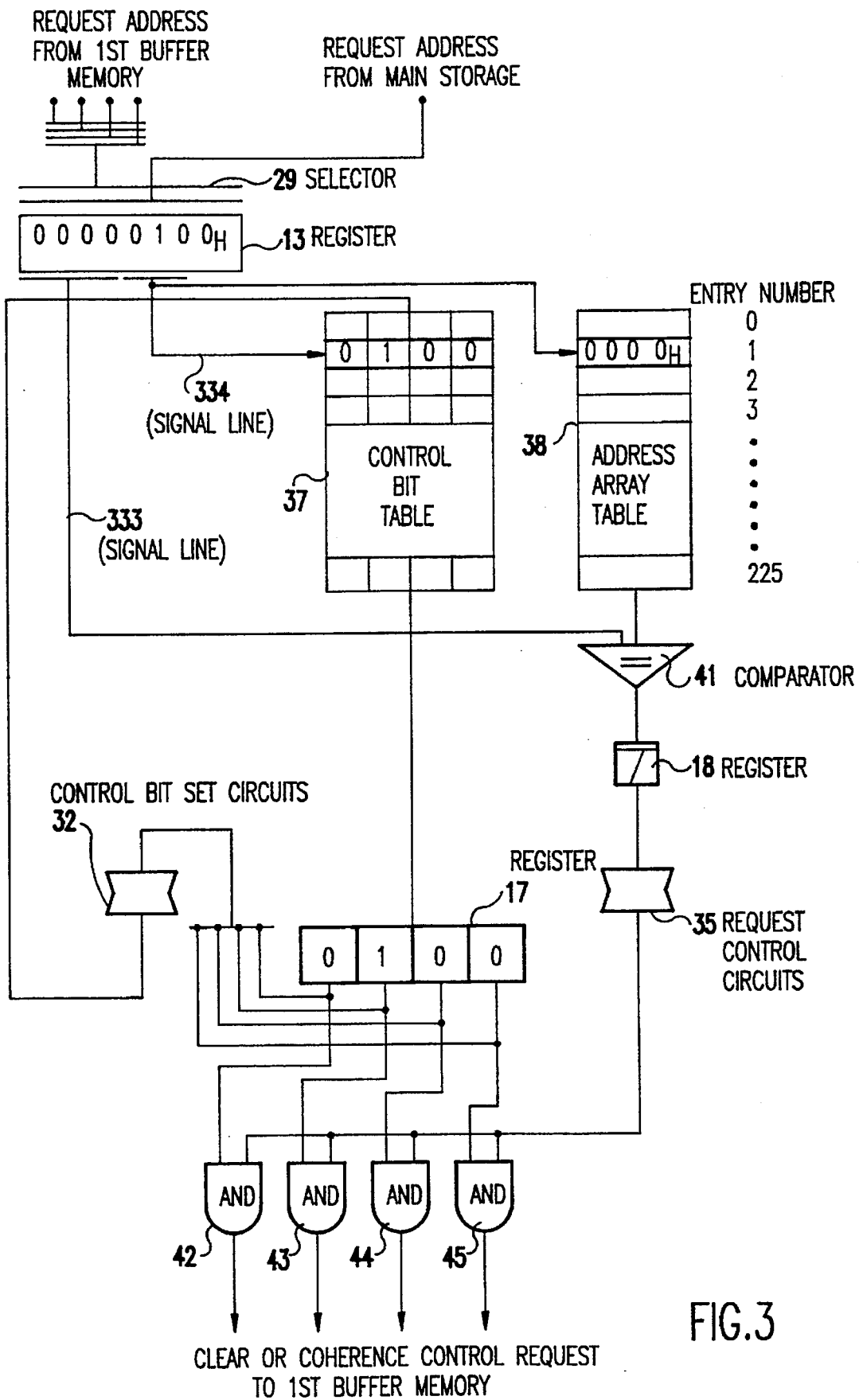
FIG. 3 is a block diagram showing the essential parts of the second buffer memory of the present invention.

Referring to FIG. 3, the second buffer memory of this embodiment is shown comprising the control bit table 37, the address array table 38, and the comparator 41. The data array table 39 has been omitted in FIG.3.

The request address is given a 32-bit number. Therefore, the register 13 for receiving the request address is a 32-bit register. The 16 high-order bits starting with the most significant bit of the register 13 are input through the signal line 333 to the comparator 41. The next 8 bits are input through the signal line 334 to the control bit circuit 37 and also to the address array table 38 and are used for indexing. The indexable entry of the control bit table 37 and the address array table 38 by the 8 bits of the request address output to the signal line 334 are 256 entries. Each entry is specified by an entry number of 0 to 255.

Each entry of the control bit table 37 is 4 bits long. Each bit of this 4 bits corresponds to four buffer memories Nos. 0, 1, 2, and 3, in this order. It is now assumed that, with respect to a certain entry block of the second buffer memory, a corresponding bit of each entry of the control bit table 37 is expressed as "1" when there is a history of access from the first buffer memory.

The address array table 38 has a 16-bit key with respect to each entry, and the comparator 41 is a 16-bit comparator. The comparator 41 outputs "1" when the output of the address array table 38 and the 16 high-order bits of the register 13 match and "0" when they do not match.

The register 17 is a 4-bit register and the register 18 is a 1-bit register. The control bit from the register 17 and the hit/miss-hit information of the second buffer memory from the register 18 are input to the AND circuits 42 to 45, which perform a logical AND operation between them and output the result of the operation.

(1) A description will now be made as to the operation in the case where a miss-hit occurs when a read request is sent from certain first buffer memory No. 1 of four first buffer memories. It is assumed that the request address is "00000100 (hexadecimal)".

The request address "00000100 (hexadecimal)" is stored in the register 13. A part of the request address "01 (hexadecimal)" is extracted from the signal line 334, and the entry of entry No. 1 of the control bit table 37 is indexed and is also the entry of entry No. 1 of the address array table 38. If it is now assumed that a value of the control bit extracted from the control bit circuit 37 is "0110 (binary)" and the value of the key extracted from the address array table 38 is "0001 (hexadecimal)", the comparator 41 will output "0" because the key value "0001 (hexadecimal)" and a numerical value "0000 (hexadecimal)" sent through the signal line 333 do not match. In the registers 17 and 18 are stored "0110 (binary)" and "0".

When a miss-hit is detected in a second buffer memory, the block data stored in the entry of entry No. 1 of the second buffer memory is cast out to main storage, and then new block data from main storage is written to the entry of entry No. 1. The address of block data to be cast out to main storage is 256 bytes consisting of the value of the key extracted from the address array table 38 starts from "0001 (hexadecimal)" and the 16 low-order bits "00010100 (hexadecimal)" of the request address stored in the register 13.

At the same time as this, a block clear request is sent to other first buffer memories. The block clear request generated in the control bit set circuit 32 is sent only to first buffer memories Nos. 1 and 2 of the four first buffer memories, because the value of the control bit stored in the register 17 is "0110 (binary)".

When new block data from the main storage is registered in a second buffer memory, "0100 (binary)" is written to entry No. 1 of the control bit table 37, so only first buffer memory No. 1 has an access history with respect to that entry No. 1. At the same time, "0000 (hexadecimal)" of the 16 high-order bits of the request address is written to entry No. 1 of the address array table 38.

(2) The operation of the miss-hit with respect to the store request will not be described because the same replacing process occurs as in the case of the miss-hit with respect to the read request described above.

(3) Next, a description will be made as to the operation in the case where, following the read request, a read request is sent from the first buffer memory No. 2 of the four buffer memories to an address of "00000100 (hexadecimal)".

The request address "00000100 (hexadecimal)" is stored in the register 13. Next, the entry of entry No. 1 of the control bit table 37 is indexed and is also the entry of the entry No. 1 of the address array table 38. Since the value of the key extracted from the address array table 38 is "0001 (hexadecimal)" and the value of the 16 high-order bits of the register 13 is "0000 (hexadecimal)", the comparator 41 outputs "1". That is, it is judged that a hit has occurred in the second buffer memory. The value of the control bit that is stored in the register 17 is "0100 (binary)" and 1 is stored in the register 18. In the next cycle, the control bit set circuit 32 updates the value of the control bit extracted from the register 17 from "0100 (binary)" to "0110 (binary)", and the updated value is written to the control bit table 37.

(4) Next, a description will be made as to the operation in the case where, following the read request, a store request is sent from first buffer memory No. 0 to an address of "00000100 (hexadecimal)".

The request address stored in the register 13 is "00000100 (hexadecimal)". The entry of entry No. 1 of the control bit table 37 is indexed and is also the entry of the entry No. 1 of the address array table 38. The control bit "0110 (binary)" is extracted from the control bit table 37 and stored in the register 17. The key "0000 (hexadecimal)" is extracted from the address array table 38 and compared in the comparator 41 with "0000 (hexadecimal)" of the higher 16 bits of the register 13. The comparator 41 outputs "1", and it is judged that a hit has occurred in the second buffer memory. In the next cycle, the coherence control request with respect to a first buffer memory generated in the request control circuit 35 is outputted from the register 18 and sent to the AND circuits 42 to 45 and to only first buffer memories Nos. 1 and 2. The control bit set circuit 32 generates a control bit "1000 (binary)" in which a bit corresponding to a first buffer memory 0 from which the store request was output is made "0", and the control bit is written to the entry No. 1 of the control bit table 37.

(5) A description will be given as to the operation in the case where, following the store request, a copy back request is sent from main storage to an address of "00000100 (hexadecimal)".

The request address stored in the register 13 is "00000100 (hexadecimal)". The entry of entry No. 1 of the control bit table 37 is indexed and is also the entry of the entry No. 1 of the address array table 38. The control bit "1000 (binary)" is extracted from the control bit table 37 and stored in the register 17. The key "0000 (hexadecimal)" is extracted from the address array table 38 and compared in the comparator 41 with "0000 (hexadecimal)" of the higher 16 bits of the register 13. The output 1 of the comparator 41 is stored in the register 17. It is determined that the second buffer memory has made a hit. In the next cycle, the block clear request with respect to a first buffer memory generated in the request control circuit 35 is output from the register 18 and sent to the AND circuits 42 to 45. In the AND circuits 42 to 45, there is performed a logical AND operation between the block clear request and the control bit "1000 (binary)" from the register 17. As a consequence, the block clear request is sent to only the first buffer memory No. 0.

(6) As described above, when a miss-hit has occurred with respect to the copy-back request, the control bit table 37 does not change and the request process is interrupted.

As has been described hereinbefore, the control bit table 37 is updated according to the present invention each time a request occurs with respect to a second buffer memory. Incidentally, this control bit table 37 does not always conform completely to the first buffer memory. For example, when a hit in the second buffer memory is detected with respect to the read request from the first buffer memory, the corresponding bit of the control bit table 37 becomes 1, as described above. However, when a block cast-out occurs in the first buffer memory, a corresponding bit of the control bit table 37 need not always be returned to "0". This is because a useless copy-back request would be sent from the second buffer memory to the first buffer memory, even if the corresponding bit of the control bit table 37 became "1" with respect to the block which has been actually cast out. The operation in this case is normal. On the contrary, there is the possibility that the load caused by performing a control instruction sent from the first buffer memory becomes large. Then, sending information on the block cast-out sent from the first buffer memory is not needed in accordance with the present invention by allowing that the state of the first buffer memory and the state of the control bit table 37 need not always conform completely.

While the above-described embodiment has been based on direct mapping type buffer memories, it is obvious that the present invention is also applicable to different types of buffer memories such as set-associative buffer memories.

As has been described hereinbefore, in the present invention, a control bit table is provided in which information corresponding to each of a plurality of first buffer memories connected to a single second buffer memory is held for each entry of the second buffer memory, and whether each first buffer memory has an access history in the past with respect to each entry of the second buffer memory is stored in the control bit table. With this, sending a coherence control request to a first buffer memory not having the access history is controlled, so the frequency of coherence control of the first buffer memories is reduced. Accordingly, the overall performance of the system can be enhanced.

What is claimed is:

1. a hierarchical buffer memory for a data processing system, comprising a plurality of first buffer memories connected to processors and at least one second buffer memory connected to main storage, wherein said second buffer memory comprises:

a coherence control identification means for identifying a data region having a possibility of being included in said first buffer memories; and a coherence control request means for, when issuing a coherence control request of a certain data region to said first buffer memories, issuing said coherence control request to only a first buffer memory identified as having a possibility of including said data region by said coherence control identification means, wherein said coherence control request means prevents issuance of coherence control requests to said first buffer memories other than said first buffer memory identified by said coherence control identification means, such that a frequency of coherence control requests received by each of said plurality of said first buffer memories is minimized.

2. The hierarchical buffer memory as set forth in claim 1, wherein said coherence control identification means includes identification flags respectively corresponding to said first buffer memories, when a miss-hit with respect to a read request occurs in said first buffer memories, only an identification flag corresponding to the first buffer memory of a processor which issued said read request is made valid and other other flags are made invalid, when a miss-hit with respect to a store request occurs in said first buffer memories, all said identification flags are made invalid, when a hit with respect to a read request occurs in said first buffer memories, an identification flag corresponding to the first buffer memory of the processor which issued said read request is further made valid, and when a hit with respect to a store request occurs in said first buffer memories, only an identification flag corresponding to the first buffer memory of the processor which issued said store request is made valid and the other flags are made invalid.

3. The hierarchical buffer memory as set forth in claim 2, wherein said first buffer memory does not inform said second buffer memory that a block has been cast out.

4. The hierarchical buffer memory as set forth in claim 2, wherein said second buffer memory further includes a means for receiving a request code sent from said main storage.

5. The hierarchical buffer memory as set forth in claim 4, wherein said first buffer memory does not inform said second buffer memory that a block has been cast out.

6. The hierarchical buffer memory as set forth in claim 1, wherein said first buffer memory does not inform said second buffer memory that a block has been cast out.

7. The hierarchical buffer memory as set forth in claim 1, wherein said second buffer memory further includes a means for receiving a request code sent from said main storage.

8. The hierarchical buffer memory as set forth in claim 7, wherein said first buffer memory does not inform said second buffer memory that a block has been cast out.

9. The hierarchical buffer memory according to claim 1, wherein said coherence control identification means includes a memory for storing a plurality of data items each corresponding to one of said first buffer memories, each of said data items indicating which one or ones of said first buffer memories have an access history to a corresponding data block.

10. The hierarchical buffer memory according to claim 9, wherein each of said data items includes flags each corresponding to one of said plurality of first buffer memories, each of said flags indicating whether the corresponding first buffer memory has an access history to the corresponding data block.

11. The hierarchical buffer memory according to claim 9, further comprising a second circuit for updating contents of said memory according to a request from said first buffer memories.

12. The hierarchical buffer memory according to claim 11, wherein said coherence control request means includes means for updating the contents of said memory when said second buffer memory does not store a data block read-requested by one of said first buffer memories, and wherein said means updates the contents of said memory to indicate that only the read-requesting first buffer memory has an access history to the data block read-requested.

13. The hierarchical buffer memory according to claim 11, wherein said coherence control request means includes means for updating the contents of said memory when said second buffer memory does not store a data block write-requested by one of said first buffer memories, and wherein said means updates the contents of said memory to indicate that none of said first buffer memories has an access history to the data block write-requested.

14. The hierarchical buffer memory according to claim 11, wherein said coherence control request means includes means for updating the contents of said memory when said first buffer memory stores a data block read-requested by one of said first buffer memories, and wherein said means updates the contents of said memory to indicate that read-requesting first buffer memory has an access history to the data block read-requested.

15. The hierarchical buffer memory according to claim 11, wherein said coherence control request means includes means for updating the contents of said memory when said second buffer memory stores a data block write-requested by one of said first buffer memories, and wherein said means updates the contents of said memory to indicate that only the write-requesting first buffer memory has an access history to the data block write-requested.

16. The buffer memory controller according to claim 1, wherein said coherence control request comprises a signal for invalidating data stored in said first buffer memories.

17. A buffer memory controller for a hierarchical buffer memory, said hierarchical buffer memory including a plurality of first buffer memories and a second buffer memory, said second buffer memory storing a plurality of data blocks, said controller comprising:

a memory for storing a plurality of data items each corresponding to one of said first buffer memories, each of said data items indicating which one or ones of said first buffer memories have an access history to a corresponding data block; and a first circuit for issuing a block clear request to clear one of said data blocks referring to contents of said memory, said first circuit issuing said block clear request to one or ones of said first buffer memories which have an access history to the data block to be cleared, wherein said first circuit prevents issuance of requests to said first buffer memories other than to said one or ones of said first buffer memory identified by said memory, such that a frequency of requests received by each of said plurality of said first buffer memories is minimized.

18. The buffer memory controller according to claim 17, wherein each of said data items includes flags each corresponding to one of said plurality of first buffer memories, and wherein each of said flags indicates whether the corresponding first buffer memory has an access history to the corresponding data block.

19. The buffer memory controller according to claim 17, wherein said controller further comprises a second circuit for updating the contents of said memory according to a request from said first buffer memories.

20. The buffer memory controller according to claim 19, wherein said second circuit includes means for updating the contents of said memory when said second buffer memory does not store a data block read-requested by one of said first buffer memories, and wherein said means updates the contents of said memory to indicate that only the read-requesting first buffer memory has an access history to the data block read-requested.

21. The buffer memory controller according to claim 19, wherein said second circuit includes means for updating the contents of said memory when said second buffer memory does not store a data block write-requested by one of said first buffer memories, and wherein said means updates the contents of said memory to indicate that none of said first buffer memories has an access history to the data block write-requested.

22. The buffer memory controller according to claim 19, wherein said second circuit includes means for updating the contents of said memory when said first buffer memory stores a data block read-requested by one of said first buffer memories, and wherein said means updates the contents of said memory to indicate that read-requesting first buffer memory has an access history to the data block read-requested.

23. The buffer memory controller according to claim 19, wherein said second circuit includes means for updating the contents of said memory when said second buffer memory stores a data block write-requested by one of said first buffer memories, and wherein said means updates the contents of said memory to indicate that only the write-requesting first buffer memory has an access history to the data block write-requested.

* * * * *